US005403656A

United States Patent [19]

Takeuchi et al.

[11] Patent Number: 5,403,656

[45] Date of Patent: Apr. 4, 1995

[54] ROTARY MEMBER FOR FIXING

[75] Inventors: Tatsuo Takeuchi, Kawasaki; Masaaki Sakurai, Yokohama; Takeshi Menjyo, Tokyo, all of Japan

[73] Assignee: Canon Kabushiki Kaisha, Tokyo, Japan

[21] Appl. No.: 899,160

[22] Filed: Jun. 15, 1992

Related U.S. Application Data

[63] Continuation of Ser. No. 447,073, Dec. 7, 1989, abandoned.

[30] Foreign Application Priority Data

| | | | |
|---|---|---|---|
| Dec. 7, 1988 | [JP] | Japan | 63-307927 |
| Jan. 27, 1989 | [JP] | Japan | 1-18531 |
| Jan. 27, 1989 | [JP] | Japan | 1-18532 |

[51] Int. Cl.[6] .................. B32B 15/06; B32B 25/20; G03G 15/20

[52] U.S. Cl. .................. 428/332; 118/60; 428/36.9; 428/36.91; 428/215; 428/334; 428/335; 428/336; 428/447; 428/448; 428/450; 492/56; 492/59

[58] Field of Search .............. 428/215, 216, 217, 404, 428/405, 36.8, 329, 447, 448, 450, 451, 36.9, 36.91, 332, 334, 335, 336; 29/132; 118/60; 492/56, 59

[56] References Cited

U.S. PATENT DOCUMENTS

| | | | |
|---|---|---|---|
| 4,064,313 | 12/1977 | Takiguchi et al. | 428/447 |
| 4,074,001 | 2/1978 | Imai et al. | 428/329 |
| 4,623,565 | 11/1986 | Huybrechts et al. | 428/35 |

FOREIGN PATENT DOCUMENTS

| | | |
|---|---|---|
| 62-255981 | 11/1987 | Japan . |
| 63-47784 | 2/1988 | Japan . |

OTHER PUBLICATIONS

European Search Report (1 page).

*Primary Examiner*—D. S. Nakarani
*Attorney, Agent, or Firm*—Fitzpatrick, Cella, Harper & Scinto

[57] ABSTRACT

This invention relates to a rotary member for fixing having an elastic layer; an off-set preventive layer as the rotary member surface layer; and an intermediate layer having silicone varnish provided between the elastic layer and the off-set preventive layer.

22 Claims, 3 Drawing Sheets

ROTARY MEMBER FOR FIXING

This application is a continuation of application Ser. No. 07/447,073, filed Dec. 7, 1989, now abandoned.

BACKGROUND OF THE INVENTION

1. Field of the Invention

This invention relates to a rotary member and a fixing device for fixing an unfixed image, particularly to a rotary member having a heat source for heating the rotary member, a rotary member for fixing which fixes an unfixed image onto a recording material by heat and pressure, and a fixing device using it.

2. Related Background Art

In the prior art, for fixing an unfixed image, a rotary member such as belt or roller, etc. has been widely practiced. Particularly, hot roller fixing which fixes an unfixed image by heat and pressure at the nip portion formed between rollers by permitting a carrier having an unfixed image between a pair of fixing rollers as the rotary member for fixing has been the main stream, partially because of simplicity of the device.

Further, for such demands to increase the layer thickness of the unfixed image and the fixing speed during fixing by such fixing rollers, a fixing device provided with elasticity has been proposed.

However, with the fixing rollers of the fixing device as described above, there has been utilized in the prior art silicone rubber, particularly silicone rubber such as TRV, LTV, etc. or those in which an inorganic agent such as red iron oxide is mixed for the purpose of satisfying both elasticity and mold releasability necessary for fixing. However, in the rubber by use of a crosslinking agent such as RTV silicone rubber or LTV silicone rubber, recrosslinking proceeds by heating to make the rubber brittle, or decompose it by thermal oxidation. Also the rubber is swelled with the silicone oil coated as the mold release agent, whereby the outer diameter as the fixing roller partially changes and there is a a problem that deleterious influence is exerted on the fixed image.

In other words, in such fixing roller, as the material satisfying elasticity and mold releasability necessary for fixing and also having sufficient printing resistance, there is no single material, but generally a constitution of plural layers is made by providing a fluorine resin or a silicone resin on a rubber (silicone rubber), thereby endowing the respective layers with functions necessary for fixing.

However, one having as fluorine resin formed as the upper layer suffers from elongation of the fluorine resin by swelling of the roller core metal and the lower layer rubber by heating, and by repetition of this, fine wrinkles will be generated on the roller surface. Also, as disclosed in Japanese Patent Laid-open No. 62-255081 or No. 58-11976, when a silicone resin film is formed by coating a silicone varnish on a rubbery elastomer, the hardness of the film is high, and further the elongation of the varnish is generally low as 50% or lower, whereby marked elongation and shrinkage of the lower layer rubber cannot be followed, with the result that not only cracks are generated but there was also possibility of occurrence of peeling.

SUMMARY OF THE INVENTION

An object of the present invention is to provide a rotary member for fixing which can prevent swelling of silicone rubber with silicone oil.

Another object of the present invention is to provide a rotary member for fixing having a surface layer which can follow thermal expansion of the rubber layer of the lower layer or the core metal.

Still another object of the present invention is to provide a rotary member for fixing having a mixed layer of silicone varnish and silicone rubber.

Further objects of the present invention will be apparent from the description given below.

DESCRIPTION OF THE PREFERRED EMBODIMENT

Now, the present invention is described with drawings, in which same or corresponding members are shown by the same numbers.

Figure 1:
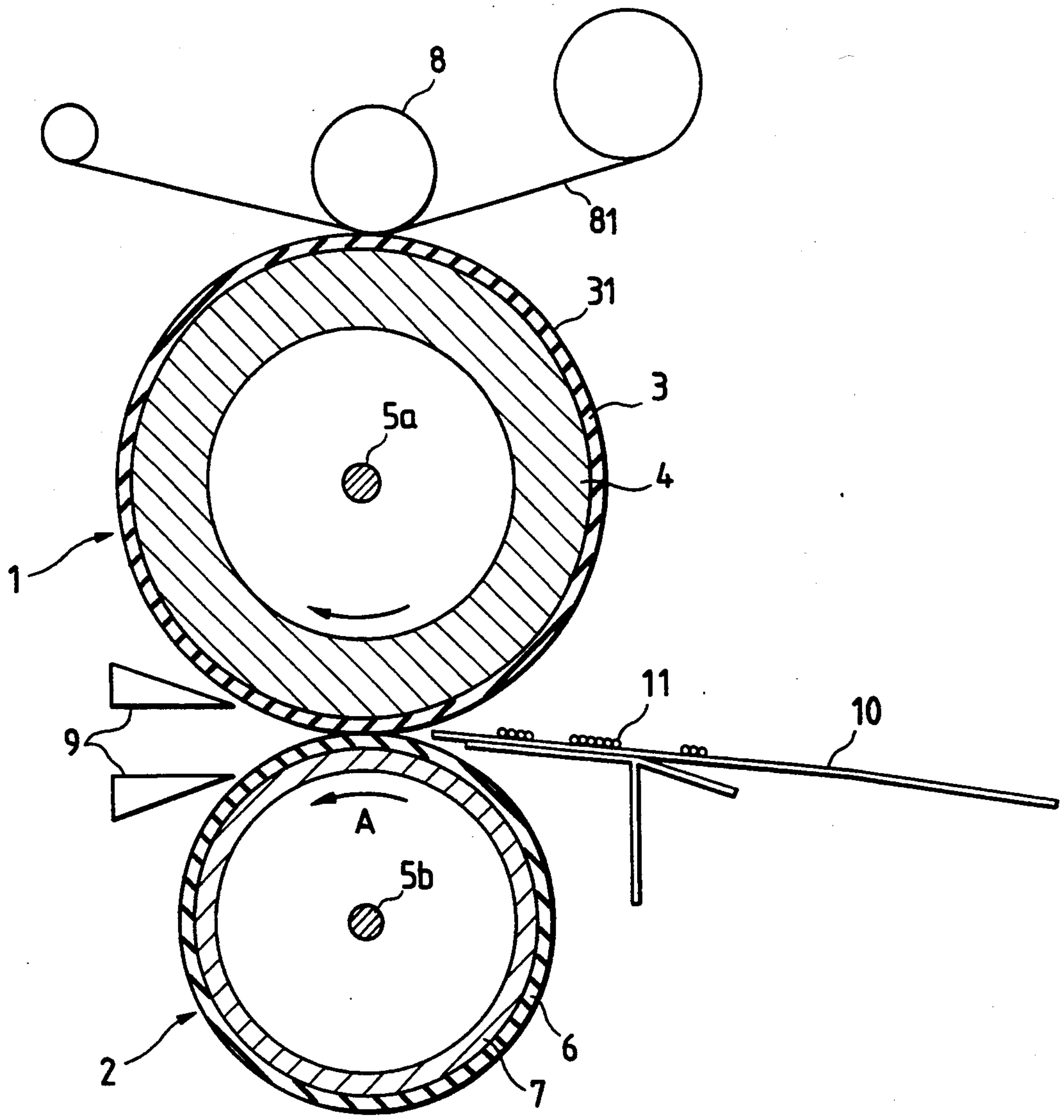
FIG. 1 is a schematic sectional view of a fixing device as an example of the present invention.

FIG. 1 is a schematic sectional view of the fixing device of the present invention. The fixing roller 1 as the rotary member for fixing has heat source 5*a* such as halogen lamp, etc. internally arranged, heat-resistant elastic layer 3 formed on the surface of hollow cylinder 4 made of aluminum or iron and further mold release layer 31 comprising a film of a mixture of silicone rubber and silicone varnish formed on this surface.

Figure 2:
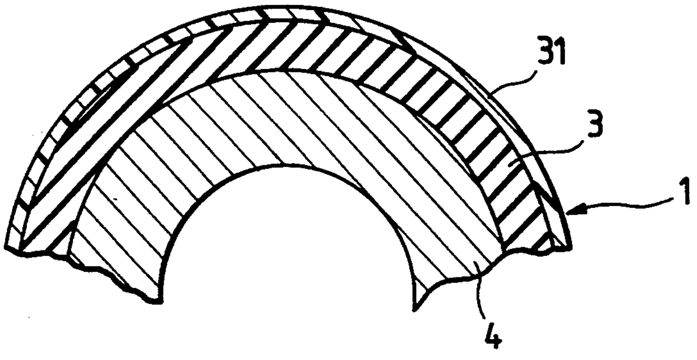
FIG. 2 is an enlarged partial sectional view of the rotary member for fixing of the device in FIG. 1.
Figure 3A:
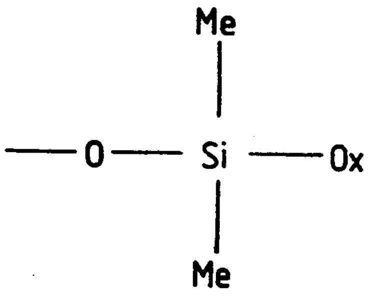
FIGS. 3A to 3D are illustrations representing the structural formula of the film formed on the surface of the rotary member for fixing of the device in FIG. 1.
Figure 3C:
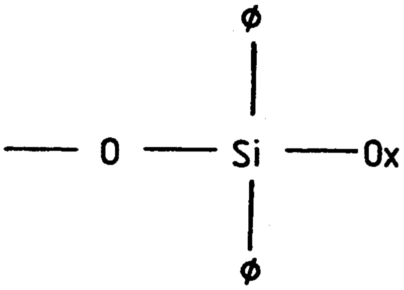
Figure 3B:
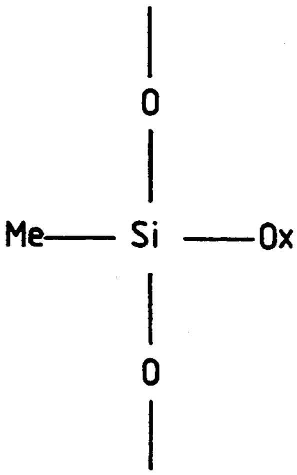
Figure 3D:
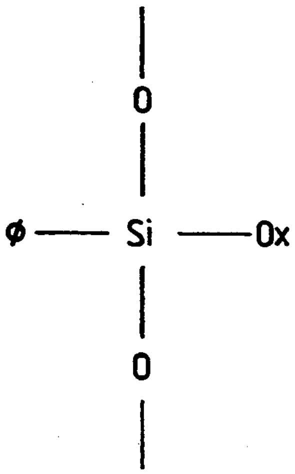

FIG. 2 is a pressurizing roller, which is a roller, having heat source 5*b* arranged internally similarly as in the fixing roller 1, and mold release layer 31 comprising a fluorine resin such as PTFE, PFA, etc., or fluorine latex layer on heat-resistant elastic layer 6, or a mixture of silicone rubber and silicone varnish similarly as in the fixing roller 1 formed on the surface of hollow cylinder 7 of aluminum, iron, etc. Further, the fixing roller 1 and the pressurizing roller 2 are pressurized by a spring, etc. (not shown) to be in contact with each other with a width (nip width) which can sufficiently supply the heat required during fixing to the image carrying member and the toner as the developer.

The actuation of the fixing device of this example is to be described. First, both rollers of the fixing roller 1 and the pressurizing roller 2 are heated by internal heat sources 5*a* and 5*b* as the power source switch of the main body (not shown) is placed in the ON state, and controlled in temperature so that the respective surface temperatures may be optimum for fixing by a temperature sensor not shown. Next, in conformity with preparation of an image carrying member (recording material) such as paper or plastic film, etc. having toner image 11 prepared according to electro-photography known in the art, the respective rollers rotate in the direction of the arrowhead A. Further, the image carrying member 10 progresses into the nip between the fixing roller 1 and the pressurizing roller 2, and at the pressure contact portion the toner image is fixed by melting with pressure, heat, and peeled off from the respective rollers by separating nail 9 to be discharged. The rollers completed of fixing, particularly the fixing roller 1 contacted with the toner image surface, are cleaned on the surface by a web 81 of the cleaning member 8, to be ready for the next fixing operation. Also, the web 81 is coated with the silicone oil as the mold releasing agent especially dimethylsilicone oil to prevent the offset of toner.

Next, the rubber layer 3 and the mold release layer 31 of the roller fixing in the fixing device 1 of the present embodiment are described in more detail.

First, for the rubber layer 3 of the lower layer, a highly heat resistant thermal vulcanization type silicone rubber (HTV silicone rubber) is used, particularly methyl vinyl silicone rubber, methyl phenyl silicone rubber, or a mixture of these. Also, since rubber alone is inferior in strength, reinforcing filler such as silica, red iron oxide, etc., and for improvement of thermal conductivity, fillers such as carbon, alumina, etc. may be also kneaded therein.

Furthermore, in order to improve an oil-proof character of the base rubber, it is desirable to increase the number of phenyl groups ($C_6H_5$) to thereby worsen intimacy with dimethylsilicone oil in increasing durability.

Next, the mixed layer 31 of silicone rubber and silicone varnish to be formed as the surface layer is to be described. The silicone rubber used here is a one-liquid or two-liquid type silicone rubber curable at room temperature, and one primarily of the condensation type and in the form of reactive polysiloxane during mixing with varnish component may be used. The silicone varnish to be mixed may be also one primarily of the condensation type capable of curing reaction similarly as the rubber, and as shown in FIGS. 3A to 3D, one comprising a mixture of a silane compound having 1 or 2 methyl groups (Me) and a silane compound having 1 or 2 phenyl groups ($\phi$) is used.

In the FIGS. 3A to 3D, —OX represents a group selected from the groups such as alkoxy group, ketoxime group, acetoxy group, aminoxy group, etc. During mixing, the materials of rubber and varnish should be controlled so that methyl groups may be more in the mixing ratio of methyl group to phenyl group for obtaining more mold releasability. Particularly, if phenyl groups comprise 80% or more in the varnish component, the mold release effect becomes insufficient. On the other hand, with the ratio of phenyl groups less than 1%, the mechanical strength of the varnish will be lowered, whereby there is possibility that the coated film may be damaged by abnormal pressurization from outside, for example, paper jamming, etc. Therefore, it is desirable if the methyl group/phenyl group ratio is 50 to 99.

Next, to describe about the mixing ratio of rubber to varnish, although it can be variously selected depending on the thermal characteristics of the toner to be fixed, in such purposes as heat resistance and prevention of swelling of dimethylsilicone oil, etc., the content of the silicone varnish component should be preferably increased, and further increase of the phenyl type silicone varnish component is preferable for prevention of oil swelling, improvement of hot impact resistance. However, if the varnish component is 90 volume % or more, the rubber component linking between varnishes may be partially lost, whereby the ability of repeated flexing ratio is lowered.

Further, for increasing flexural resistance and mold releasability, it is preferable to increase the silicon rubber component. Particularly concerning mold releasability, for obtaining sufficient mold releasability with a wide toner viscosity of $10^2$ to $10^{12}$ poise during fixing, one-liquid type RTV silicone rubber obtained from a reactive dimethylpolysiloxane having only methyl group is preferable. However, if the ratio of the rubber contained is 75 vol. % or more the ratio of oil swelling will be abruptly increased whereby it becomes difficult to maintain dimensional precision during uses for a long term. Under the conditions as described above, the mixing ratio of rubber and varnish may be suitably selected.

In practical formation of coated film, first, on a core metal such as aluminum, iron, etc., the above-mentioned silicone rubber is formed by a molding method such as compression, injection, etc., and then polishing, grinding, etc. is performed for a finishing position, if necessary. Next, a mixture of silicone varnish and silicone rubber as described above diluted to 10 to 50% with a solvent such as toluene, etc. is coated by such method as dip coating, spraying, etc. The thickness of the coated film may be 5 to 300 μm, preferably 10 to 70 μm. If the thickness of the coated film is less than 5 μm there is not only the possibility that the subbing rubber layer may be partially exposed due to coating irregularity, etc., but also the coated film may be damaged in the case when the pressure is abnormally increased such as paper jamming, whereby practical use may be rendered impossible. Also, for forming the coated film to a thickness of 300 μm or more, the coating working is repeated for several times, or the solid component in the coating liquid itself is increased whereby coating irregularity due to liquid dragging or irregularity in drying and curing conditions may occur to give a homogeneous film with difficulty.

As mentioned above, in the present embodiment, since an anti-oil effect relative to the silicone oil is obtained by the silicone varnish and adjacent varnishes are connected by the silicone rubber, there occurs no crack even if the lower layer is expanded or deformed. Incidently, as mentioned above, the character may vary corresponding to the ratio of the methyl groups and phenyl groups, and ratio of the varnish amount and rubber amount.

In the following, specific examples based on the present invention are shown as experimental examples practiced following the conditions as described above, and comparative examples according to experimental examples of the prior art are described with comparison of the both, and the experimental results are shown in Table 1. Hardness of rubber shown in experimental examples and comparative examples is all measured value of the test A form of the spring type hardness based on the JIS vulvanized rubber physical test method

EXPERIMENTAL EXAMPLE 1

On an aluminum core metal of 40 mm in diameter, a HTV silicone rubber with a rubber hardness of 70° was molded with a thickness of 1 mm, and on the HTV silicone rubber was formed a surface layer comprising a mixture containing a rubber component mixed with a ratio of varnish amount/rubber amount of 5 relative to the varnish of the varnish components with a ratio of methyl groups/phenyl groups of 13 to a thickness of 70 μm. By use of this as the fixing roller and one component negative toner as the toner, a fixing test was conducted at a roller surface temperature of 180° and a circumferential speed of 300 mm/sec.

EXPERIMENTAL EXAMPLE 2

The same experiment as in the experimental example 1 was carried out except that the lower layer rubber hardness was changed to 60° and the ratio of methyl groups/phenyl groups of the varnish component to 10.

EXPERIMENTAL EXAMPLE 3

By use of the fixing roller with a lower rubber hardness of 70°, a thickness of 2 mm and having a surface layer with a ratio of methyl groups/phenyl groups of varnish component of 30, and a ratio of varnish amount-/rubber amount of 0.8 formed to a thickness of 50 μm, fixing test was conducted at a roller surface temperature, a roller circumferential speed of 50 mm/sec by use of one-component negative toner.

EXPERIMENTAL EXAMPLE 4

The same experiment as in experimental example 3 was conducted by use of a fixing roller with a lower rubber hardness of 70°, a thickness of 3 mm, having a surface layer with a ratio of methyl groups/phenyl groups of the varnish component of 50 and a ratio of varnish amount/rubber amount of 1.5 formed to a thickness of 50 μm.

EXPERIMENTAL EXAMPLE 5

The same experiment as in experimental example 3 was conducted by use of a fixing roller with a lower rubber hardness of 50°, a thickness of 3 mm, having a surface layer with a ratio of methyl groups/phenyl groups of the varnish component of 20 and a ratio of varnish amount/rubber amount of 0.1 formed to a thickness of 50 μm.

EXPERIMENTAL EXAMPLE 6

The same experiment as in the experimental example 3 was conducted by use of a fixing roller with a lower rubber hardness of 60°, a thickness of 2 mm, having a surface layer with a ratio of methyl groups/phenyl groups of the varnish component of 1.7 and a ratio of varnish amount/rubber amount of 5 formed to a thickness of 70 μm.

EXPERIMENTAL EXAMPLE 7

The same experiment as in the experimental example 1 was conducted by use of a fixing roller with a lower rubber hardness of 70°, a thickness of 1 mm, having a surface layer with a ratio of methyl groups/phenyl groups of the varnish component of 10 and a ratio of varnish amount/rubber amount of 20 formed to a thickness of 30 μm.

COMPARATIVE EXAMPLE 1

The same experiment as in experimental example 3 was conducted by use of a fixing roller having a RTV silicone rubber with a hardness of 60° molded to a thickness of 3 mm on an aluminum core metal.

In the respective tests of the experimental examples and comparative examples, dimethylsilicone oil (100 CS) was used-as-the auxiliary mold release agent.

TABLE 1

| | Surface layer | | | | | |
|---|---|---|---|---|---|---|
| | Varnish component Methyl groups/ phenyl groups | Varnish amount/ rubber amount | Rubber thickness (mm)/ hardness | Printing resistance | Dimensional stability (heating coating of 100 CS dimethyl-silicone oil) | Others (condition, etc.) |
| Example 1 | 13 | 5 | 1/70° | 50,000 sheets or more | ○ | No damage generated even paper jamming generated compulsorily |
| Example 2 | 10 | 5 | 1/60° | 50,000 sheets or more | ○ | The same as above |
| Example 3 | 30 | 0.8 | 2/90° | 10,000 sheets or more | ◎ | Normally the condition of causing high temperature off-set, but mold releasable because of holding sufficient silicone oil in the surface layer |
| Example 4 | 50 | 1.5 | 3/70° | 10,000 sheets or more | ○ | The same as above |
| Example 5 | 20 | 0.1 | 3/50° | X | X | Pressure distribution generated by penetration of oil to generate fixing irregularity on image when oil of low viscosity is coated. |
| Example 6 | 1.7 | 5 | 2/60° | X | ○ | Dimethylsilicone oil of 100 CS repelled, but initial mold releasability poor |
| Example 7 | 10 | 20 | 1/70° | X | X | Cracks generated when strongly pressurized |
| Comparative Example 1 | None | None | 3/60° | 6,000 sheets or more | X | Swelling due to oil generated immediately |

As mentioned heretofore, the layer made by mixing silicone varnish and silicone rubber is provided on the surface of the rotary member for fixing having the rubber layer as a lower layer, the following advantages can be obtained.

(i) Since the varnish having more fine construction than the rubber is presented between the lowered rubber and the surface, even if dimethylsilicone oil rendering high mold releasing character from the surface is applied, dimensional accuracy of the roller can be sufficiently maintained.

(ii) Silicone varnish naturally having high hardness and low expancible character becomes expancible or shinkable because it has the rubber portion inside thereof, which enables to react the sudden pressure change due to paper clogging, whereby durability and anti-shock character increases.

(iii) Since the silicone oil can be held by the thin layer at the surface into which the oil is not entered, it becomes possible to fix even under the condition in which high temperature off-set is generated normally, which increases responsibility.

Next, the mixed layer of silicone varnish and silicone rubber of the present invention will be explained in detail.

Above resin used for the surface mold release layer 31 has the characteristics of both silicone rubber and silicone varnish, comprising a rubbery linear siloxane polymer of which the unit constituting the resin is dimethylpolysiloxane or methyl phenyl polysiloxane having a molecular weight of $10^4$ to $5\times10^5$, to which is linked a polysiloxane compound having a three-dimensional structure shaped in the so called silicone varnish with the respective constituent units of $RSiO_{\frac{3}{2}}$, $R_2SiO$, $R_3SiO_{\frac{1}{2}}$, $SiO_2$ (R is methyl group or phenyl group) being linked mutually through Si—O—Si bond.

Thus, the surface mold release layer 31, after curing thereof, becomes a block copolymer of rubbery silicone and varnish-like silicone.

The characteristics of the resin coating as the surface mold release layer 31 thus formed can be varied by selecting the molecular weight of the rubbery silicone as described above and the numbers of methyl groups, phenyl groups of side chains, and also the functionality and the numbers of methyl groups, phenyl groups at the varnish-like silicone moiety.

For example, for enhancing mold releasability during fixing, it is preferable to control the molecular weight of the rubbery silicone to about 30,000 to 200,000, and also the methyl groups of side chains to 50% or higher. Particularly, if the molecular weight is made 200,000 or more, the resin itself becomes rubbery and when dimethylsilicone oil is used as the mold release auxiliary agent, oil swelling becomes marked to the lower layer as the elastic layer 3, which is not preferable for stabilization of the outer diameter of the fixing roller 1. Further, if the molecular weight is made 30,000 or less, the rubber characteristics will be lowered to give inferior flexing characteristic. Also, for reducing oil swelling, it is preferable to have a slight amount of phenyl groups in the side chains. However, if the number of phenyl groups exceeds 50%, it become difficult to obtain sufficient mold releasability, so the number of phenyl group is desirably less than 50%.

Next, to describe about the varnish portion of the silicone resin formed as the surface mold release layer 31 on the elastic layer 3, the lower layer is required to have a rubber layer as the elastic layer 3 and the resin to have sufficient flexing characteristic. However, even if the molecular weight of the rubbery portion as described above may be set at 30,000 or more, if the functionality at the varnish portion, namely the ratio of R/Si (R is number of methyl group or phenyl group, Si is number of silicone) is less than 1, the hardness of the resin coating as the surface mold release layer 31 formed becomes too high, whereby deformation of rubber cannot be followed to give rise to cracks. etc.

Adequate value of the R/Si ratio is 1 or more and less than 2, desirably, also for obtaining coating strength, preferably set at 1 to 1.7. Further, also on the varnish side, the methyl group number/phenyl group number is an important element. If this value is 5 or less, the resin coating hardness becomes high whereby subtle peeling may occur by repeated flexing, and such peeling may sometimes induce off-set during fixing from the initial stage. For obtaining mold releasability in a wide width of toner viscosity during fixing from $10^2$ to $10^{12}$ poise, it is preferable to set methyl/phenyl ratio at 8 to 1000 more desirably 50 to 200. More preferably, above ratio is set 50 to 99.

In the following, another experimental examples of the present invention will be explained. Rubber hardness shown in the experimental examples according to the present invention and the comparative examples as the prior art examples is all measured value of the spring type hardness test A form based on the JIS vulcanized rubber physical testing method.

EXPERIMENTAL EXAMPLE 8

On an aluminum core metal of 38 mm in diameter as hollow cylinder 4, HTV methyl phenyl silicone rubber with rubber hardness of 40° was formed as elastic layer 3 with a thickness of 1 mm, and on the elastic layer 3 was formed a block copolymer silicone resin with the rubbery portion of the silicone resin comprising dimethyl polysiloxane having a molecular weight of 100,000, and the varnish portion shaped in three-dimensional network having methyl/phenyl ratio of 50 and R/Si ratio of 1.7 with a thickness of 30 μm as the surface mold release layer 31. By using this product as the fixing roller, and a color toner for 2C2C-1 (manufactured by Canon) with the toner viscosity of $10^4$ poise or less during fixing as the toner, fixing test of full color image was conducted at a roller surface temperature of 170° C. and a circumferential speed of 90 mm/sec.

EXPERIMENTAL EXAMPLE 9

The experiment was conducted under the same conditions as in the experimental example 1 except for changing the methyl/phenyl ratio at the varnish-like portion of the silicone resin as the surface mold release layer 41 to 100.

EXPERIMENTAL EXAMPLE 10

By use of a lower layer rubber as the elastic layer 4 with a hardness of 70°, a block copolymer silicone resin with the rubbery portion of the silicone resin having a molecular weight of 40,000 and a methyl/phenyl ratio of 2, and the varnish-like portion of the silicone resin having a methyl/phenyl ratio of 8 and R/Si ratio of 1.5 was formed with a thickness of 30 μm as the surface mold release layer 41. By use of this product as the fixing roller and a polyester toner for NP-7550 (manufactured by Canon), fixing test was conducted at a roller temperature of 185° C. and a circumferential speed of 380 mm/sec.

COMPARATIVE EXAMPLE 2

On an aluminum core metal of 58 mm in diameter as hollow cylinder 4, RTV silicone rubber with a hardness of 40° was formed as the elastic layer 3 with a thickness of 3 mm, and by use of this product as the fixing roller, the test was conducted in the same manner as in the experimental example 1.

COMPARATIVE EXAMPLE 3

On an aluminum core metal of 58 mm in diameter as hollow cylinder 4, HTV silicone rubber with hardness of 40° was formed as the elastic layer 3 with a thickness of 1 mm, and on the elastic layer 3 was formed a silicone resin having no rubbery portion of silicone resin with a methyl/phenyl ratio of 50 and a R/S ratio of 1.5 with a thickness of 30 μm as the surface mold release layer 41. By using this product as the fixing roller, the fixing test was conducted under the same conditions as in the experimental example 3.

In the above five examples, as the mold release auxiliary agent, dimethylsilicone oil with a viscosity of 100 cs was used in the form coated to 0.05 to 0.2 g per one sheet of transfer material.

The results are shown below in Table 2.

On the other hand, when a pressurizing roller with an outer diameter of 50 mm is prepared by coating the silicone resin used in the experimental example 8 on an elastic layer formed with a rubber hardness of 40° and a thickness of 5 mm, and using a fixing roller coated on the surface with polytetrafluoroethylene of the same diameter having no rubber layer as the elastic layer in combination, the pressure for obtaining nip width of 5 mm was 16 kg and also without generation of pressure distribution.

TABLE 2

| | Silicone resin composition | | | | | |
|---|---|---|---|---|---|---|
| | Rubbery structure portion | | Three-dimensional structure portion | | | Printing |
| Molecular weight | Molecular weight | Methyl groups/ phenyl groups | R/Si ratio | Methyl groups/ phenyl groups | resistance (A4 sheets) | Results (Oil swelling, etc) |
| Experimental Example 8 | $10^5$ | Only methyl groups | 1.7 | 50 | more than 10,000 | Oil swelling is small and toner mold release under low viscosity state is possible. |
| Experimental Example 9 | The same as above | The same as above | The same as above | 100 | more than 15,000 | Altough more in oil swelling amount as compared with Experimental example 8, but usable at higher temperature. |
| Experimental Example 10 | $4 \times 10^4$ | 2 | 1.5 | 8 | more than 50,000 | Substantially no oil swelling. |
| Comparative Example 2 | Only RTV | | No resin | | 8,000 | Marked oil swelling, No dimentional stability. |
| Comparative Example 3 | | | 1.5 | 50 | 1,000 | Not contained, peeling occurred after small number of successive copying to bring about off-set. |

As is apparent from the above Table 2, in the experimental example 8, the swelling amount with oil is reduced, and mold release of toner under low viscosity state is possible, in the experimental example 9, although the swelling amount with oil is larger as compared with the experimental example 8, use is possible at higher temperature, and further in the experimental example 10, the effect is obtained that there is substantially no swelling with oil. In contrast, in comparative example 8, swelling with oil is marked and dimensional stability is lacking, in comparative example 9, only durability for small number sheets is possessed, with small peeling occurred with small number of sheets to bring about off-set.

The above description has been made about examples by use of the rotary member for fixing according to the present invention as the fixing roller which contacts and fixes the unfixed toner image, but as described above, the rotary member for fixing according to the present invention can be used as the pressurizing roller 2 shown in FIG. 1 as a matter of course.

In this case, the principal object of the pressurizing roller 2 is formation of contact width (nip width) by the fixing roller 1 and the pressurizing roller 2, and preparation of the surface mold release layer with the silicone resin according to the present invention is sufficiently suited for this object.

For example, in the prior art, on a HTV methyl phenyl silicone rubber with a thickness of 5 mm or more which is the elastic layer, one coated with a fluorine resin tube of PFA, etc. with a thickness of some 10 μm as the mold release layer has been used as the mold release layer. Even if the hardness of the rubber itself may be lowered, the PFA tube is hard to make the hardness substantially higher. For this reason, in the prior art, the pressure for ensuring necessary nip width becomes greater, whereby pressure distribution is liable to occur.

In contrast, when one obtained by use of the same lower layer rubber as the elastic layer and coated on the elastic layer through an adhesive layer with PFA tube with a thickness of 25 μm as the pressurizing roller, not only the pressure accomplishing average nip width of 5 mm became 20 kg, but also there was difference in nip width approximate to 1 mm between the center in the roller lengthy direction and the end portion, and also pressure distribution occurred. The respective rollers as described above are all prepared in right cylindrical shapes.

In the above description, those shaped in rollers have been described as the rotary member for fixing, but the present invention is applicable to those shaped in belt as a matter of course.

Next, another embodiment of the present invention is explained.

In order to prevent swelling due to the oil of fixing roller, for example as disclosed in Japanese Patent Publication Nos. 54-41330 or 54-41331, the roller for fixing in which the anti-oil or oil-proof layer is provided between the higher layer and lower layer as the intermediate layer is proposed.

In this roller for fixing, the fluorosilicone rubber, fluorine rubber or the mixture of these rubbers and other rubbers is used. The anti-oil layer, which material functions as the barrier layer due to anti-oil character, and prevents the mold releasing agent coated on the roller from passing through the upper layer and penetrating into the lower layer.

However, according to the result of the experiment made by inventors, in the roller for fixing having such construction, although entry of the mold releasing agent into the lower layer can be prevented, since adhering character of the anti-oil layer with the upper and lower layers is very weak, even if various adhesive agents or the rubber having high adhesing character with the upper and lower layers are blended into the anti-oil layer, it is hard to increase adhering strength to the satisfactory extent.

Figure 4:
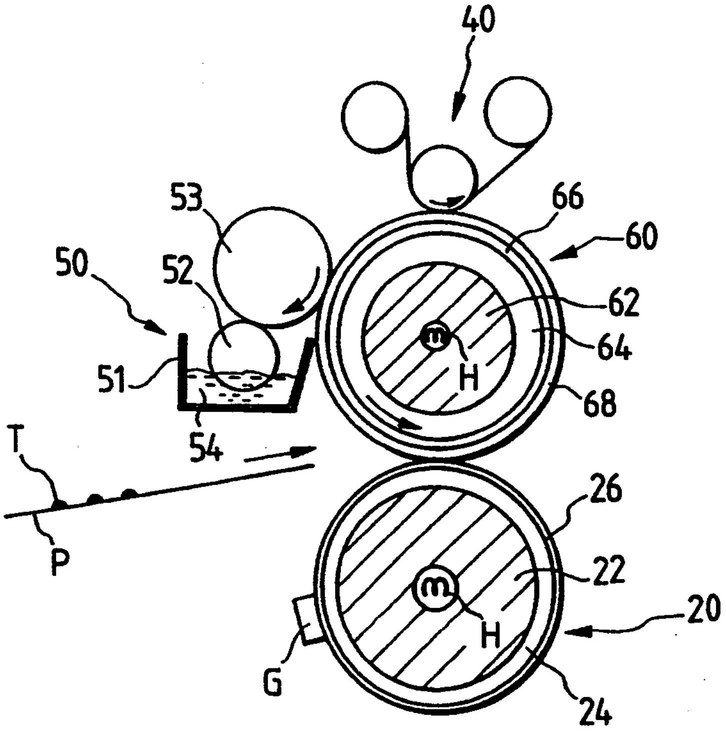
FIG. 4 is a schematic sectional view of the fixing device using the rotary member for fixing according to the present invention.

FIG. 4 shows an example in which the rotary member for fixing according to the present invention is embodied in the roller for fixing to be utilized for a fixing device for heat fixing of the toner image in electrophotographic copying device.

The fixing device, as schematically illustrated in FIG. 4, is constituted of roller 60 for fixing in contact with unfixed toner image T carried on the reading material P which is, for example, transfer paper, and roller 20 for pressurization which pushes the recording paper P carrying the toner image against the fixing roller 60.

According to the present embodiment, the roller 60 for fixing has core metal 62 with good thermal conductivity such as aluminum, etc., elastic layer 64 such as HTV (high temperature vulcanization type) silicone rubber formed on the core metal 62, oil resistant layer 66 formed on the elastic layer 64, off-set preventive layer 68 such as RTV (room temperature vulcanization type) silicone rubber layer formed as the external layer of the oil resistant layer 66, and is formed in this example with an outer diameter of 40 mm. The roller 60 for fixing will be described later in more detail.

The pressure roller 20, in this example, has aluminum core metal 22, elastic layer 24 such as HTV (high temperature vulcanization type) silicone rubber layer with a thickness of 1 mm formed outside of the core metal, and further fluorine resin layer 26 formed on its surface, and is prepared in this example with an outer diameter of 40 mm.

The above-mentioned fixing roller 60 and pressure roller 20 are pressed against each other to a predetermined contact force by an appropriate pressurization means (not shown).

Also, internal to the core metals 62, 22 of the fixing roller 60 and the pressure roller 20, halogen heater H is arranged, and the surface temperature of the roller 20 is detected by thermistor G in contact with the surface of the roller 10 for pressurization to control the halogen heater H based on the detected temperature. By such temperature control, the temperatures of the roller 60 and the roller 20 are maintained at the constant temperature of about 170°.

Further, the fixing device of this example is equipped with mold release coating device 50 and cleaning device 40, the mold release agent stored in liquid tank 51, by roller group 52, 53 of the mold release coating device, for example, silicone oil 54 with oil viscosity of 300 CS is coated on the fixing roller 60 and the toner off-set on the fixing roller 60 is removed by cleaning device 40.

Next, the fixing roller 60, according to the present invention is described in more detail.

In the fixing roller 60, various materials are available as the elastic layer 64 formed so as to have adequate elasticity, but as described above, HTV silicone rubber is excellent in tensile strength, adhesives with core metal, thermal conductivity, elasticity is preferred.

More preferably, as the elastic layer 64, HTV silicone rubber with high thermal conductivity is preferred. This is because, by use of rubber with high thermal conductivity, heat can be supplied rapidly to the roller surface, whereby lowering in roller surface temperature by passing of recording material P can be prevented to effect fixing stably in temperature.

Particularly, when used as a roller for fixing in a color image forming device, the temperature of the roller fixing has great influence on color mixing, with the temperature change of roller affecting as the change in color tone of color image, and therefore high thermal conductivity HTV silicone rubber stable in temperature is suitable.

As the elastic layer 64, high thermal conductivity methyl phenyl HTV silicone rubber is also preferable. When such methyl phenyl HTV silicone rubber is used, particularly oil resistance is excellent, and oil resistance of the roller as a whole is further improved. In this Example, the elastic layer 64 available may have a thermal conductivity of $1.0\times10^{-3}$ cal/cm.sec., but one having preferably $0.5\times10^{-3}$ cal/cm.sec. is preferred in view of the above point.

As the surface layer of the fixing roller 60, off-set preventive layer 68 is formed for prevention of off-set of the toner melted by heating onto the surface of the roller 1. The off-set preventive layer 68, particularly when sharp melt toner susceptible to off-set as in color image forming device, etc. is used, since a large amount of silicone oil is coated on the surface of the fixing roller 60 to enhance mold releasability, should be preferably LTV, RTV silicone rubber having good wettability with the silicone oil, particularly RTV silicone rubber most excellent in mold releasability among silicone rubbers.

Further, as RTV silicone rubber, either two-liquid type RTV silicone rubber or one-liquid type RTV silicone rubber may be available. However, it is preferable to use one-liquid type RTV silicone rubber, because adhesion to oil resistant layer 66 is more firm as described later in detail. This is because one-liquid type RTV has adhesiveness with the counterpart substance before vulcanization thus becoming finally more firm in adhesion to the oil resistant layer 66.

According to the present embodiment, the fixing roller 60 has oil resistant layer 66 between the elastic layer 64 and the off-set preventive layer 68 as described above. The oil resistant layer 66 may be formed by coating silicone varnish diluted in a solvent at a ratio of 10 to 50% in terms of weight percentage around the outer peripheral of the elastic layer 64 by such method as dipping or spraying, etc., followed by curing.

The thickness of the oil resistant layer 66 may be 5 to 300 μm, preferably 10 to 200 μm. With a layer thickness less than 5 μm, there is possibility that the subbing layer may be exposed partially on account of coating irregularity, etc. whereby oil may be penetrated into the subbing rubber layer. Also, when a coated film is formed to 300 μm or more, it is prepared by repeating the coating working for several times, or increasing the solid component of the coating liquid itself, coated film irregularity due to liquid dragging, or further irregularity due to drying and curing conditions may occur, whereby homogeneous film can be obtained with difficulty. Also, further by making thus the film thickness of oil resistant layer thicker, due to insufficient mechanical strength of the silicone varnish during rotation of the fixing roller for fixing, cracks, etc. may be generated.

The silicone varnish to be used in this example may be one primarily of the condensation type curing reaction, and as shown below, may be one comprising a mixture of a silane compound having 1 to 3 methyl groups and a silane compound having 1 to 3 phenyl groups.

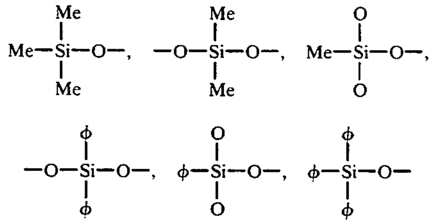

wherein Me is methyl group, φ is phenyl group.

The off-set preventive layer 68 of the above-mentioned RTV silicone rubber as the surface layer is formed by coating by knife coating on the oil resistant layer 66.

Also, the RTV silicone rubber of the surface layer may be also coated by spray coating instead of coating by knife coating, and it can be also formed particularly by cast molding known in the art.

However, since the off-set preventive layer 68 is made a thin layer with a layer thickness of 0.01 to 0.5 mm, the setting dimensional precision of the preparation device is severe according to the preparation method by cast molding to give rise to difficulties in bulk production, etc., and therefore preparation method by way of knife coating or spraying, etc. may be said to be suitable for bulk production.

An experiment was conducted by assembling a fixing device with as shown in FIG. 4 equipped with the fixing roller 60 having the construction as described above in a commercially available color electrophotographic device. In the case of a fixing device using of a fixing roller coated merely with the RTV silicone rubber on HTV silicone rubber of the prior art the roller outer diameter swelled from 40 mm to 42 mm after about 10,000 sheets so as to generate paper wrinkles, but in the case of using the fixing device by use of the roller for fixing according to the present embodiment, the roller outer diameter was not changed but remained as 40 mm at 10,000 sheets, and further the diameter remained as 40 mm even after fixing 20,000 sheets, whereby good fixing actuation could be done.

In the present experiment, for the color electrophotographic device, a toner having sharp melt characteristics with a low softening point and a low melt viscosity was employed.

To describe further about the sharp melt characteristics, the toner with sharp melt characteristics is prepared by melting and kneading, for example, a polyester resin, a styrene-acryl resin, a colorant (dye, sublimable dye), a charge controller, etc., followed by pulverization and classification. If necessary, various external additives can be added in the toner.

Particularly, as the color toner, one using a polyester resin as the binder resin is preferable when fixability, sharp melt characteristics are taken into consideration. Such polyester resin with sharp melt characteristics is made a polymeric compound having ester bonds in the main chain of the molecule synthesized from a diol compound and a dicarboxylic acid.

Figure 5:
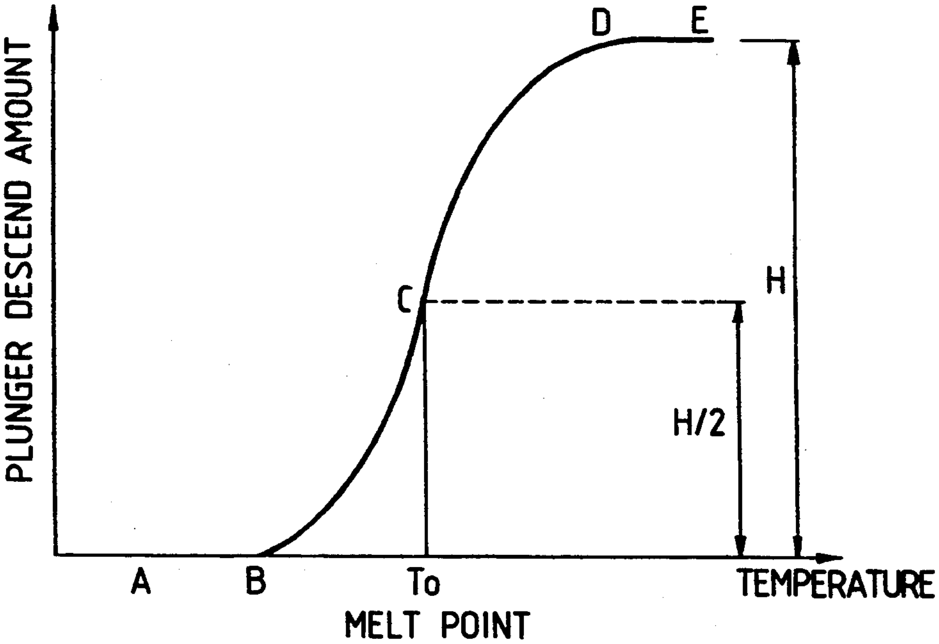
FIG. 5 is a graph showing the softening characteristics of sharp melt toner.

The softening point of the polyester resin with sharp melt characteristics used in the present experiment was made 60° to 150° C., preferably 80° to 120° C. The softening characteristic of the toner with sharp melt characteristics as shown in FIG. 5. Measurement was conducted according to the following method.

By use of a flow tester CFT-500 Model (manufactured by Shimazu Seisakusho) with a diameter of die (nozzle) of 0.5 mm and a thickness of 1.0 mm, an extrusion load of 50 kg was applied and the plunger drop amount-temperature curve (hereinafter called softening S curve) of the toner drawn when the temperature was elevated at equal rate of 5° C./min. at an initial set temperature of 80° C. after pre heating time of 300 seconds is determined. As the toner for sample, 1 to 3 g of fine powder purified is used and the plunger sectional area is made 1.0 $cm^2$. The softening S curve becomes a curve as shown in FIG. 5. With the progress of equal rate temperature elevation, the toner is gradually heated to initiate flowout (plunger drop A→B). When temperature is further elevated, the toner which became under molten state 1 flow out greatly (A→B→C), whereby the plunger drop stops (D→E).

The height H of the S-curve indicates the whole amount flowed out and the temperature $T_0$ corresponding to the point C of H/2 indicates the softening point of the toner.

Such resin with sharp melt characteristics is a resin satisfying the conditions of $T_1=90°$ to 150° C., $|\Delta T|=|T_1-T_2|=5°$ to 30° C., when the temperature when indicating melt viscosity of $10^5$ cp is defined as $T_1$ and the temperature when indicating $5\times10^4$ cp as $T_2$.

The resin with sharp melt characteristics having these temperature-melt viscosity characteristics is characterized in that the viscosity is lowered extremely sharply by heating.

Such viscosity lowering causes adequate mixing of the uppermost toner layer and the lowest toner layer to occur, and further increases abrupt increases of transparency of the toner layer, thereby effecting good color detractive mixing.

Such color toner with sharp melt characteristics has great affinity force, and is liable to be off-set onto the fixing roller.

Also, according to another example of the present invention, as the oil resistant layer 66, a mixture of silicone varnish and silicone rubber can be used instead of the silicone varnish in the above example. The thickness of the oil resistant layer 66 may be 5 to 300 μm, preferably 10 to 200 μm as described above.

The silicone rubber to be used in ths example is a silicone rubber of one-liquid or two-liquid room temperature curing type, primarily of the condensation type and one in the form of reactive polysiloxane during mixing with the varnish component may be used.

On the other hand, for the silicone varnish to be mixed, similarly as the above silicone rubber one primarily of the condensation type curing reaction may be employed and one comprising a mixture of a silane compound having 1 to 3 methyl groups and a silane compound having 1 to 3 phenyl groups as shown below may be used.

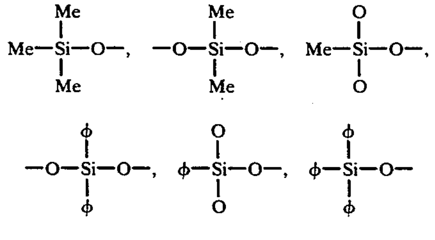

wherein Me is methyl groups and φ is phenyl group.

Particularly, it is preferable if the mixing ratio of methyl groups to phenyl groups "methyl groups/phenyl groups" is 5 or more and 99 or less.

Next, to describe about the mixing ratio of silicone rubber to silicone varnish, for the reason as mentioned above, it is preferable the varnish component is less than 90 volume %, as well as silicone rubber component is less than 75 vol %.

The method for coating the oil resistant layer in this example can be carried out in the same manner as in the coating method of silicone varnish as previously described.

When the experiment of fixing was carried out in the same manner as in the case of the previous example by use of a roller for fixing according to ths example which is different only in the material of the oil resistant layer from the roller for fixing of the previous example, good fixing actuation could be done without change in diameter as 40 mm even at 10,000 sheets and further without change in diameter change at 30,000 sheets.

According to still another example of the present invention, as the oil resistant layer 66, a resin of the type which is more consolidated in structure of the mixture of silicone rubber and silicone varnish of the above example (hereinafter called "resin") can be also used. The thickness of the oil resistant layer 66 may be 5 to 300 μm, preferably 10 to 200 μm, as described above.

This resin is a block copolymer type resin, comprising units of a linear methyl phenyl polysiloxane having a rubbery structure to which a polysiloxane having a three dimensional network structure is added, which is cured according to the known method such as humidity curing at room temperature or dehydrating condensation.

In this resin for such purposes as heat resistance of the oil resistant layer, prevention of swelling of dimethylsilicone oil to the lower layer, etc., the ratio of the number of phenyl groups to the number of methyl groups [methyl groups/phenyl groups] in the linear methyl phenyl polysiloxane may be 1 or more and 99 or less, preferably 50 or less to increase the number of phenyl groups.

Next, also in the polysiloxane having a three dimensional network structure, the ratio of "methyl groups/phenyl groups" also participates in silicone oil resistance, and if this ratio is 30 or more affinity for dimethylsilicone oil is increased, whereby a swelling preventive effect can not be obtained. In practical use, the ratio of "methyl groups/phenyl groups" should be preferably 20 or less. However, if it is 1 or less, the coating hardness will be increased by increase of phenyl groups, whereby there is possibility that cracks, etc. may be generated.

Having described above about the conditions of the block copolymer type resin, these conditions may also have effects independently, but more preferable effects can be obtained by setting the both conditions at optimum values.

When the experiment of fixing was conducted in the same manner as in the previous example by preparation of the same roller as in the above respective examples except for forming an oil resistant layer by use of the above materials, the roller could be used continuously without change in diameter even at 30,000 sheets.

It is needless to say, the present invention can not be limited to the above embodiments, but can deforme with the scope of the technical concept thereof.

We claim:

1. A rotary member for fixing comprising:
an elastic layer;
a surface layer forming an outer layer of said rotary member; and
an intermediate layer made of block co-polymer having a non-linear structure, wherein said block copolymer comprises a silicone composition having a linear structure and silicone composition having a three dimensional structure, said intermediate layer provided between the elastic layer and the surface layer,
wherein said elastic layer includes a HTV silicone rubber and said surface layer includes a RTV silicone rubber.

2. A rotary member for fixing according to claim 1, wherein said intermediate layer has a thickness of 5 to 300 μm.

3. A rotary member for fixing according to claim 2, wherein said intermediate layer has a thickness of 10 to 200 μm.

4. A rotary member for fixing according to claim 1, wherein said surface layer has a thickness of 0.01 to 0.5 μm.

5. A rotary member for fixing according to claim 1, wherein the content of said silicone composition having a three dimensional structure is less than 90 vol. % in total of a silicone composition having linear structure and a silicone composition having a three dimensional structure.

6. A rotary member for fixing comprising:
an elastic layer;
a surface layer forming an outer layer of said rotary member; and
an intermediate layer made of block co-polymer having a non-linear structure, wherein said block copolymer comprises a silicone composition having a linear structure and silicone composition having a three dimensional structure, said intermediate layer provided between the elastic and the surface layer,
wherein said elastic layer is a methyl phenyl HTV silicone rubber.

7. A rotary member for fixing comprising:
an elastic layer;
a surface layer forming an outer layer of said rotary member; and
an intermediate layer made of block co-polymer having a non-linear structure, wherein said block copolymer comprises a silicone composition having a linear structure and silicone composition having a three dimensional structure, said intermediate layer provided between the elastic and the surface layer,
wherein said silicone varnish composition is a mixture of silane compound having methyl group and a silane compound having phenyl group.

8. A rotary member for fixing according to claim 7, wherein the ratio of said methyl group/phenyl group is 5 to 99.

9. A rotary member for fixing according to claim 8, wherein the ratio of said methyl group/phenyl group is 20 or less.

10. A rotary member for fixing according to claim 7, wherein the content of said silicone composition having a three dimensional structure is less than 75 vol. % in total of a silicone composition having linear structure and a silicone composition having a three dimensional structure.

11. A rotary member for fixing comprising:
an elastic layer;

a surface layer forming an outer layer of said rotary member; and an intermediate layer made of block co-polymer having a non-linear structure, wherein said block co-polymer comprises a silicone composition having a linear structure and silicone composition having a three dimensional structure, said intermediate layer provided between the elastic and the surface layer, wherein said silicone composition having a three dimensional structure added to a silicone composition having a linear structure which is linear methyl phenyl polysiloxane.

12. A rotary member for fixing comprising:

a silicone rubber layer; and a surface layer made of block co-polymer having a non-linear structure, wherein said block co-polymer comprises a silicone composition having a linear structure and a silicone composition having a three dimensional structure, said surface layer disposed on said silicone rubber layer, wherein said silicone composition having three dimensional structure has a ratio of methyl groups/phenyl groups of 8 to 1000.

13. A rotary member for fixing according to claim 12, wherein said silicone composition having a linear structure is a siloxane polymer.

14. A rotary member for fixing according to claim 13, wherein said siloxane polymer is dimethyl polysiloxane or methyl phenyl polysiloxane.

15. A rotary member for fixing according to claim 12, wherein said silicone composition having a three dimensional structure is a polysiloxane compound.

16. A rotary member for fixing according to claim 12, wherein said silicone rubber layer is methyl vinyl silicone rubber or methyl phenyl silicone rubber or a mixture of these.

17. A rotary member for fixing according to claim 12, wherein R/Si of said silicone composition having a three dimensional structure is at least 1 and less than 2, with R being a number of methyl groups or phenyl groups and Si being number of silicone atoms.

18. A rotary member for fixing according to claim 17, wherein R/Si is 1 or more and 1.7 or less.

19. A rotary member for fixing according to claim 12, wherein the ratio of said methyl groups/phenyl groups is between 50 and 200.

20. A rotary member for fixing according to claim 12 wherein the surface layer has a thickness of 5 to 300 μm.

21. A rotary member for fixing according to claim 20 wherein said surface layer has a thickness of 10 to 70 μm.

22. A rotary member for fixing comprising:

a silicone rubber layer; and a surface layer made of block co-polymer having a non-linear structure, the block co-polymer comprising a silicone composition having a linear structure and a silicone composition having a three dimensional structure, said surface layer being disposed on said silicone rubber layer, wherein said block co-polymer has phenyl group.

* * * * *

UNITED STATES PATENT AND TRADEMARK OFFICE

CERTIFICATE OF CORRECTION

PATENT NO. : 5,403,656 Page 1 of 2

DATED : April 4, 1995

INVENTOR(S) : TATSUO TAKEUCHI, ET AL.

It is certified that error appears in the above-indentified patent and that said Letters Patent is hereby corrected as shown below:

Column 1,
line 42, "a a" should read --a--; and
line 54, "having as" should read --having--.

Column 3,
line 4, "heat," should be deleted.

Column 4,
line 60, "method" should read --method.--.

Column 6,
line 27, "used-as-the" should read --used as the--.

Column 8,
line 28, "2C2C-1" should read --C2C-1--.

Column 9,
Table 2, "resistance" should read --Printing resistance--; "Printing Results" should read --Results--; and "Altough" should read --Although--.

Column 10,
line 67, "adhesing" should read --adhesive--.

UNITED STATES PATENT AND TRADEMARK OFFICE

CERTIFICATE OF CORRECTION

PATENT NO. : 5,403,656

DATED : April 4, 1995

INVENTOR(S) : TATSUO TAKEUCHI, ET AL.

It is certified that error appears in the above-indentified patent and that said Letters Patent is hereby corrected as shown below:

Column 13,
line 29, "device with" should read --device--; and
line 32, "using of" should read --using--.

Column 15,
line 15, "ths" should read --this--.

Column 16,
line 52, "varnish composition" should read --composition having a three dimensional structure--; and
line 56, "methyl group/phenyl group" should read --methyl group/phenyl group in the mixture of silane compound--.

Column 17,
line 12, "is" should read --is a--.

Column 18,
line 18, "claim 12" should read --claim 12,--; and
line 20, "claim 20" should read --claim 20,--.

Signed and Sealed this

Eighth Day of August, 1995

Attest:

Bruce Lehman

BRUCE LEHMAN

*Attesting Officer*

*Commissioner of Patents and Trademarks*